United States Patent
Brown et al.

(10) Patent No.: US 11,404,865 B2
(45) Date of Patent: Aug. 2, 2022

(54) DIRECT CURRENT BUS CAPACITOR BREAKDOWN PROTECTION CIRCUIT FOR DRIVES

(71) Applicant: Rockwell Automation Technologies, Inc., Mayfield Heights, OH (US)

(72) Inventors: Brian P. Brown, Mayville, WI (US); Amrita Sharma, Milwaukee, WI (US); Michael P. Albert, Wausatosa, WI (US); Rangarajan M. Tallam, Germantown, WI (US); Ethan B. Monroe, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 17 days.

(21) Appl. No.: 17/141,821

(22) Filed: Jan. 5, 2021

(65) Prior Publication Data

US 2022/0216692 A1 Jul. 7, 2022

(51) Int. Cl.
| | |
|---|---|
| *H02H 9/02* | (2006.01) |
| *H02K 11/33* | (2016.01) |
| *H02H 9/04* | (2006.01) |
| *H02P 29/024* | (2016.01) |

(52) U.S. Cl.
CPC ............. *H02H 9/02* (2013.01); *H02H 9/04* (2013.01); *H02K 11/33* (2016.01); *H02P 29/027* (2013.01); *H02P 29/0241* (2016.02)

(58) Field of Classification Search
CPC . H02H 9/02; H02H 9/04; H02K 11/33; H02P 29/0241; H02P 29/027
USPC ........................................................ 361/91.1
See application file for complete search history.

(56) References Cited

U.S. PATENT DOCUMENTS

| | | | | |
|---|---|---|---|---|
| 8,154,895 B2* | 4/2012 | Gilmore | .................. | H02M 1/36 363/129 |
| 9,673,695 B1* | 6/2017 | Li | .................. | H02M 1/32 |
| 9,837,924 B1* | 12/2017 | Wei | .................. | H02M 7/125 |
| 2004/0095784 A1* | 5/2004 | Zhou | .................. | H02M 5/458 363/37 |

(Continued)

FOREIGN PATENT DOCUMENTS

| | | |
|---|---|---|
| CN | 102497090 | 6/2012 |
| CN | 202384991 | 8/2012 |

OTHER PUBLICATIONS

Extended European Search Report for EP Application No. 21215516.2, dated May 11, 2022; 7 pages.

*Primary Examiner* — Dharti H Patel

(57) ABSTRACT

To avoid the catastrophic failure of a drive, protection circuitry is configured to limit current in the DC bus capacitors. The drive may include an isolation circuit and a protection circuit having a comparator. The protection circuit may be configured to compare the voltage measured across a DC bus capacitor with a threshold voltage and activate the isolation circuit when the DC capacitor voltage exceeds the threshold voltage. The drive may also include a low voltage circuit coupled to the isolation circuit, where the low voltage circuit is configured to interrupt the bypass signal to disengage the bypass circuit and activate the precharge circuit when the isolation circuit is activated. Accordingly, the current in the drive and to the DC bus capacitors is limited by the precharge circuit when the voltage of a capacitor in the DC bus exceeds a threshold.

20 Claims, 6 Drawing Sheets

(56) References Cited

U.S. PATENT DOCUMENTS

| | | | |
|---|---|---|---|
| 2013/0119903 A1* | 5/2013 | Weiss | H02H 9/001 318/400.3 |
| 2013/0121051 A1* | 5/2013 | Weiss | H02P 6/20 363/131 |
| 2013/0289911 A1* | 10/2013 | Patel | H02M 5/4585 702/65 |
| 2016/0172992 A1* | 6/2016 | Tallam | H02M 1/36 363/37 |
| 2016/0204709 A1* | 7/2016 | Patel | H02M 7/125 363/37 |
| 2017/0324333 A1* | 11/2017 | Xiao | H02M 3/24 |
| 2018/0062557 A1* | 3/2018 | Tao | H02P 29/024 |
| 2019/0067932 A1* | 2/2019 | Li | H02H 3/202 |
| 2019/0229521 A1 | 7/2019 | Roberts et al. | |

\* cited by examiner

DIRECT CURRENT BUS CAPACITOR BREAKDOWN PROTECTION CIRCUIT FOR DRIVES

BACKGROUND

For various machines, including in automation environments, drives may be used to control motors. Drives often include a direct current (DC) bus that includes capacitors. During failure, the capacitors in the DC bus may overcharge for a number of reasons including that other capacitors may fail or short, causing others to overcharge. Capacitors have a limited capacity to gracefully handle an overcharge condition. Because the DC bus is high voltage, this overcharge may cause the capacitor to ignite or explode, causing catastrophic failure to the drive and possibly damaging other equipment.

SUMMARY

To avoid the catastrophic failure described above, a solution described herein includes configuring a DC bus capacitor breakdown protection circuit in the drive. The drive may include a precharge circuit configured to limit current in the drive. The drive may also include a bypass circuit coupled to the precharge circuit, the bypass circuit may be configured to bypass the precharge circuit in response to a bypass signal. The drive may also include a DC bus having capacitors. The drive may also include an isolation circuit. The drive may also include a protection circuit having a comparator, where the protection circuit is coupled to the isolation circuit and a capacitor of the DC bus. The protection circuit may be configured to compare the voltage measured across the capacitor with a threshold voltage and activate the isolation circuit when the voltage exceeds the threshold voltage. The drive may also include a low voltage circuit coupled to the isolation circuit, where the low voltage circuit is configured to interrupt the bypass signal to disengage the bypass circuit and activate the precharge circuit when the isolation circuit is activated. Accordingly, the current in the drive and to the DC bus capacitors is limited by the precharge circuit when the voltage of a capacitor in the DC bus exceeds a threshold.

Implementations may include one or more of the following features. The precharge circuit may be coupled in series with one or more fusible resistors coupled to the DC bus. The precharge circuit may include at least one resistor, and the fusible resistors may be configured to fail before the resistors in the precharge circuit ignite. In some embodiments, the protection circuit is powered with the voltage measured across the DC bus capacitor. In some embodiments, the low voltage circuit is powered with the bypass signal. In some embodiments, the low voltage circuit is further configured to trigger a drive imbalance fault in response to the activation of the isolation circuit. The drive may further include an inverter and a controller. The controller may be configured to disable the inverter to limit current in the drive in response to the drive imbalance fault. In some embodiments, the low voltage circuit may include a latch circuit, and the latch circuit may be configured to activate in response to the protection circuit activating the isolation circuit and continue to interrupt the bypass signal when the isolation circuit deactivates. In some embodiments, the capacitors in the DC bus are coupled in series, each capacitor has a corresponding protection circuit, each protection circuit has a corresponding isolation circuit, and each protection circuit is coupled to the low voltage circuit through a respective isolation circuit. In some embodiments, the isolation circuit may include an optocoupler that, when activated, electrically conducts to electrically couple the protection circuit to the low voltage circuit.

BRIEF DESCRIPTION OF THE DRAWINGS

Many aspects of the disclosure can be better understood with reference to the following drawings. The components in the drawings are not necessarily drawn to scale. Some components or operations may not be separated into different blocks or may be combined into a single block for the purposes of discussion of some embodiments. Moreover, in the drawings, like reference numerals designate corresponding parts throughout the several views. While several embodiments are described in connection with these drawings, the disclosure is not limited to the embodiments disclosed herein. The technology is amendable to various modifications and alternative forms. The disclosure and figures herein are intended to provide a description of certain embodiments, and the intent is to cover all alternatives, modifications, and equivalents.

DETAILED DESCRIPTION

Figure 1:
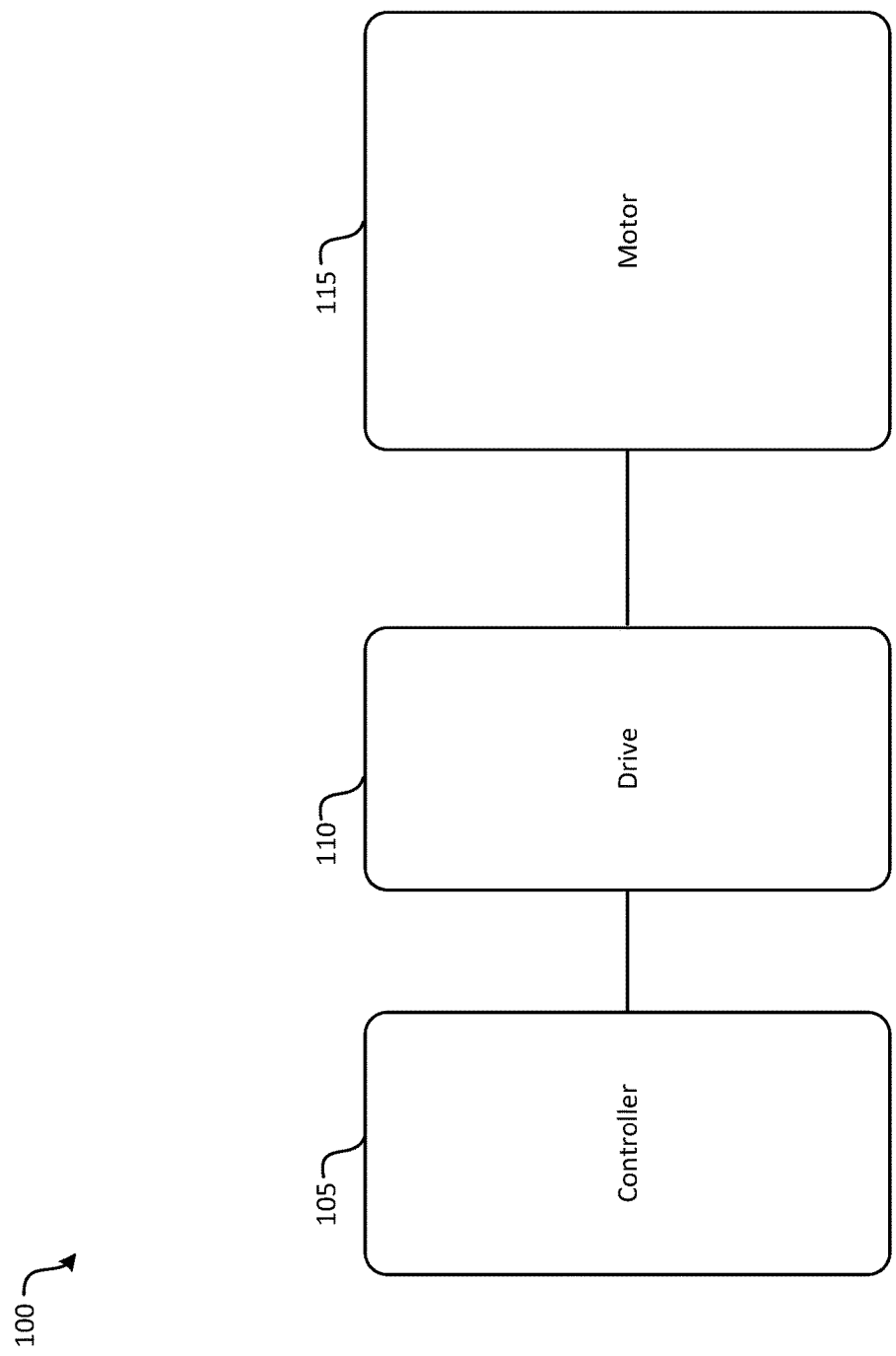
FIG. 1 illustrates components of an automation machine, according to some embodiments.

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Drives used to control motors often have a high voltage DC bus. The DC bus capacitors have high charging values, so failure can cause catastrophic failure to the drive and potentially to other equipment. To obtain Underwriter Laboratories (UL) and Conformitè Europëenne (CE) certification, a drive must pass a DC bus capacitor short circuit test (e.g., conformance to UL/IEC 61800-5-1 standards for drives). When a capacitor in the DC bus is shorted out, an overcharge condition may occur for the other capacitors in the DC bus. To pass the test, the bus capacitor is shorted until an acceptable ultimate result is obtained (e.g., opening of a protective device such as a fuse), and the drive may not have an emission, flame, molten metal, or ignition of cotton, the customer voltages are to remain at safe operating levels, and the protective cover of the drive should remain attached such that the customer is not exposed to high voltage. However, when shorting one bus capacitor, the voltage across other capacitors may increase beyond the surge voltage rating of the capacitor, increasing its leakage current and power dissipation significantly. As a result, one or more capacitors experiencing the overvoltage condition (i.e., exceeding its surge voltage) may ignite and/or explode. Without a contingency to interrupt power to the drive and/or limit the current, the drive will likely fail the test.

To resolve the problems described above, described herein is protection circuitry used to monitor the capacitors in a DC bus for an overcharge condition. Upon detecting the overcharge condition, the precharge circuit is reintroduced into the circuit to put the drive into precharge mode. During precharge mode, the current in the drive is limited. Further, fusible resistors may be placed in series with the precharge circuit to open the circuit prior to failure of the precharge circuit resistors, interrupting power through the drive. Additionally, a drive imbalance fault may be triggered. The controller may disable the inverter, disabling the drive, in response to the drive imbalance fault. As a result, current in the drive is limited or interrupted completely, and the drive is disabled before components reach the point of explosion and/or ignition.

Turning to FIG. 1, a system 100 is depicted. The system 100 may be a portion of a machine used in an automation environment, for example. The system 100 includes a controller 105, a drive 110, and a motor 115. The controller 105 may be a programmable logic controller or any other suitable controller that may be used to control the drive 110 and/or other components of the system 100 including input and output (I/O) of machines and other components not shown. The drive 110 may be any suitable drive including an alternating current (AC) drive, a DC drive, a servo drive, a stepper drive, or any other type of drive having a DC bus. The motor 115 may be controlled by the drive 110 and may be any suitable type of motor corresponding to the drive type including an AC motor, a DC motor, a servo motor, a stepper motor, or any other type of motor. System 100 is intended to provide a simplified configuration of components of a machine, however system 100 may include many other components including other controllers 105, drives 110, and motors 115 as well as other types of components and machines used in an automation environment.

Figure 2:
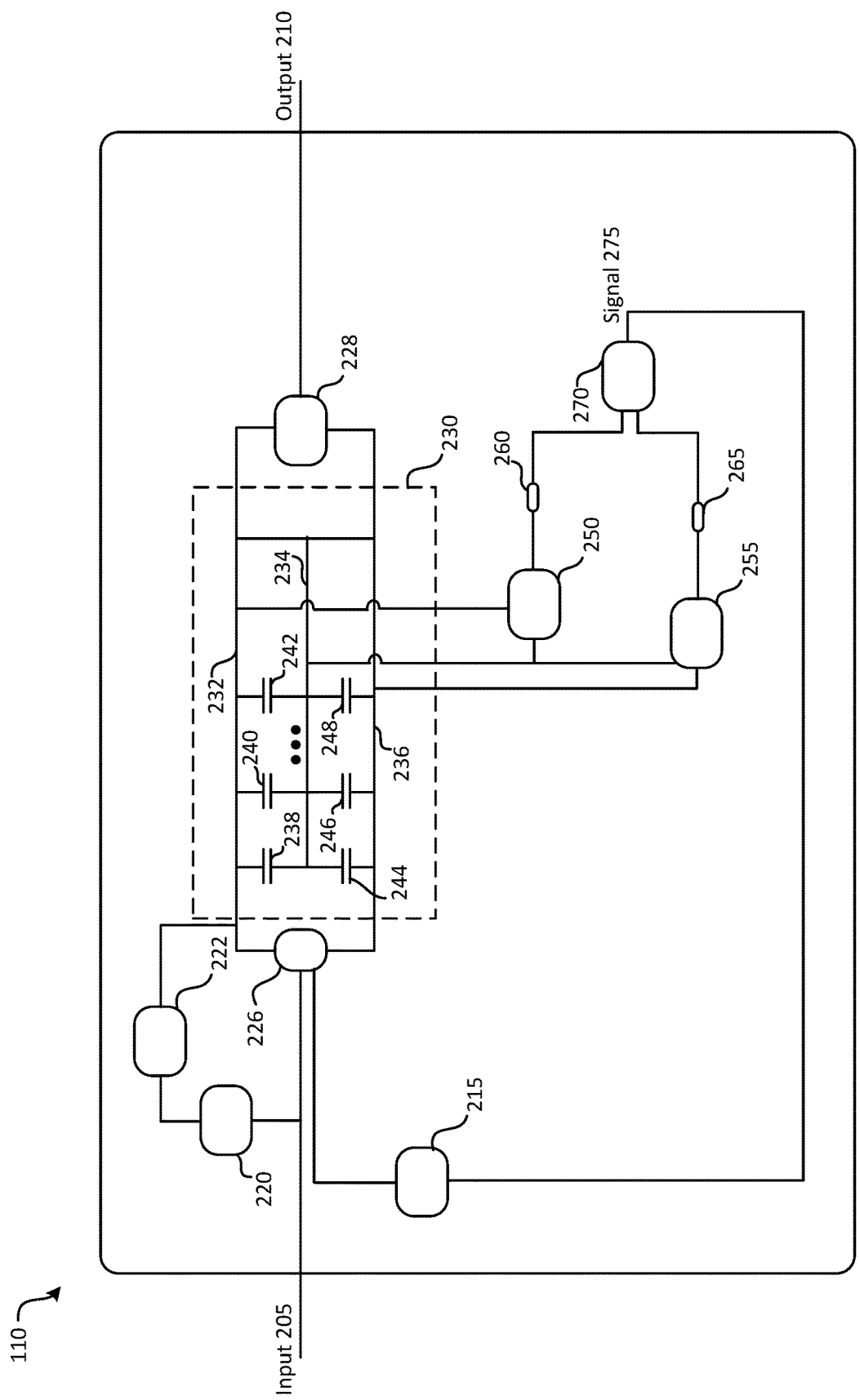
FIG. 2 illustrates a drive, according to some embodiments.

FIG. 2 illustrates further detail of drive 110. Drive 110 includes an input 205, output 210, controller 215, precharge circuit 220, fusible resistors 222, controlled rectifier 226 (e.g., thyristor rectifier), DC bus 230, inverter 228, protection circuits 250 and 255, isolation circuits 260 and 265, low voltage circuit 270, and signal 275. Drive 110 may include other components not depicted here for ease of description. For example, drive 110 may include a power supply, I/O ports, and other components not shown or described.

Input 205 may include power and/or signals that originate from a power supply and/or from controller 105. Output 210 may include signals that are transmitted to motor 115.

Precharge circuit 220 is used during precharge of drive 110. During initial startup of drive 110, the input 205 includes power, but the components within the drive are not yet charged to operate the drive 110 properly. As such, the precharge circuit 220, which includes at least a resistor, limits current within the drive and particularly to DC bus 230, allowing components within drive 110 to ramp up to operating charge. The precharge circuit 220 may include multiple precharge resistors in parallel and/or other components. While the precharge circuit 220 is engaged or activated, the drive is in precharge mode. Once components of the drive 110 are sufficiently charged after startup, the precharge bypass signal is activated, and the controlled rectifier 226 activates, causing the precharge circuit 220 to be bypassed and the input 205 to flow to the controlled rectifier 226 rather than flowing through the precharge circuit 220. During normal operation of the drive 110, the precharge bypass signal remains activated (i.e., uninterrupted) such that the drive 110 is not returned to precharge mode until the drive is restarted. The rectifier 226 converts the AC input to DC for the DC bus 230. The inverter 228 converts the DC output from the DC bus 230 into AC, which is output to the motor at output 210.

The fusible resistor 222 is placed in series with the precharge circuit 220, coupled to the DC bus 230. The fusible resistor 222 is configured to fail safely (i.e., exhibit very high impedance between its terminals), causing an open in the circuit and stopping current flow from the precharge circuit 220 to the DC bus 230. In some embodiments, the fusible resistor 222 includes multiple fusible resistors 222 coupled in series and/or in parallel. The time to failure of the fusible resistor 222 can be selected such that the fusible resistor 222 may fail due to abnormally high current flow before resistors in the precharge circuit overheat and ignite.

The DC bus 230 includes a positive bus rail 232, a midbus rail 234, and a negative bus rail 236. The positive bus rail 232 is at the highest voltage, the negative bus rail 236 is at a lower voltage, and the midbus rail is at a voltage between that of the positive bus rail 232 and the negative bus rail 236. For example, in a 480-volt drive, the voltage difference between the positive bus rail 232 and the midbus rail 234 under normal operating conditions may be approximately 340 volts. The voltage difference between the midbus rail 234 and the negative bus rail 236 may similarly be approximately 340 volts. Capacitors 238, 240, and 242 are coupled in parallel. Capacitors 238, 240, and 242 couple the positive bus rail 232 to the midbus rail 234, such that each charge to the voltage difference between the positive bus rail 232 and the midbus rail 234. The positive bus rail 232, midbus rail 234, and capacitors 238, 240, and 242 in combination are sometimes called the upper bus. Three capacitors 238, 240, and 242 are shown coupled in parallel, but any number of capacitors may be included in the upper bus. Each capacitor 238, 240, 242 has a surge voltage rating. In a 480-volt drive, the capacitors selected may have a surge voltage rating of, for example, 450 volts.

Within DC bus 230, capacitors 244, 246, and 248 are coupled in parallel. Capacitors 244, 246, and 248 couple the midbus rail 234 to the negative bus rail 236, such that each charge to the voltage difference between the midbus rail 234 and the negative bus rail 236. The midbus rail 234, negative bus rail 236, and capacitors 244, 246, and 248 in combination are sometimes called the lower bus. Three capacitors 244, 246, and 248 are shown coupled in parallel, but any number of capacitors may be included in the lower bus. The lower bus capacitors 244, 246, 248 are coupled in series with the upper bus capacitors 238, 240, 242, respectively. Only an upper bus and lower bus are depicted, however more bus portions may be included in DC bus 230 by adding additional rails and coupling more capacitors in series between the rails and in parallel with the bus portions. Continuing the example of a 480-volt drive, the voltage difference between the midbus rail 234 and the negative bus rail 236 may be approximately 340 volts, and the surge voltage rating of capacitors 244, 246, 248 may be approximately 450 volts.

Protection circuit 250 is coupled to the positive bus rail 232 and the midbus rail 234 of the DC bus 230 to monitor the voltage across capacitors in the upper bus. If the voltage across capacitors 238, 240, 242 exceeds a threshold (e.g., the surge voltage rating of the capacitors), the protection circuit 250 will activate the isolation circuit 260, electrically coupling the protection circuit 250 with the low voltage circuit 270 as described in more detail with respect to FIGS. 3 and 4. The surge rating of the capacitors 238, 240, 242 is known, so the protection circuit 250 is configured based upon the surge rating or other selected threshold. The surge rating may be, for example, between 200 and 600 volts, such as 450 volts. Upon activation of the isolation circuit 260, the low voltage circuit 270 will activate to interrupt the precharge bypass signal, putting the drive 110 back into precharge mode and may transmit a fault signal 275 to controller 215 as described in more detail with respect to FIGS. 3 and 5.

Protection circuit 255 is coupled to the midbus rail 234 and the negative bus rail 236 of the DC bus 230 to monitor the voltage across capacitors in the lower bus. If the voltage across capacitors 244, 246, 248 exceeds a threshold, the protection circuit 255 will activate the isolation circuit 265, electrically coupling the protection circuit 255 to the low voltage circuit 270 as described in more detail with respect to FIGS. 3 and 4. The surge rating of the capacitors 244, 246, 248 is known, so the protection circuit 255 is configured based upon the surge rating or other selected threshold. The surge rating may be, for example, between 200 and 600 volts, such as 450 volts. Upon activation of the isolation circuit 265, the low voltage circuit 270 will activate to interrupt the precharge bypass signal, putting the drive 110 back into precharge mode and may transmit a fault signal 275 to controller 215. If additional bus portions are included (not shown), additional protection circuits can be added to measure the voltage across the bus rails. Further, other configurations of the measurement points of the bus rails may be used by the protection circuits. For example, the measurement may be configured across the positive bus rail 232 and the negative bus rail 236 as described in more detail with respect to FIGS. 3 and 5.

In use, the drive 110 is started and input 205 provides power to precharge circuit 220. The current flows through fusible resistors 222 into DC bus 230. The capacitors 238, 240, 242, 244, 246, 248 are all below the threshold voltage because the drive is operating normally. The protection circuits 250 and 255 monitor the voltages of the capacitors 238, 240, 242, 244, 246, 248. The isolation circuits 260 and 265 are not activated, so the protection circuits 250 and 255 and the low voltage circuit 270 are also not activated. The current flows from DC bus 230 to inverter 228 and to output 210.

To test the drive 110, capacitor 238 is shorted with, for example, a contactor, for a duration of time such as ten minutes. Shorting capacitor 238 will cause a voltage surge across capacitor 244, coupled in series to capacitor 238. The voltage surge across capacitor 244 will be detected by protection circuit 255 as described in more detail with respect to FIGS. 3 and 4. Upon detection of the voltage surge, the isolation circuit 265 will activate, electrically coupling protection circuit 255 with low voltage circuit 270, which activates low voltage circuit 270. Low voltage circuit 270 will, in response, interrupt the precharge bypass signal, putting the drive in precharge mode such that controlled rectifier 226 is deactivated (i.e., switched off), and input 205 will flow through precharge circuit 220. Precharge circuit 220 is configured to limit current into DC bus 230. However, the current may, at this point in operation, be sufficiently high to overload precharge resistors in the precharge circuit 220. The fusible resistors 222 may fail, causing an open in the circuit before the precharge resistors ignite and interrupting current flow to the DC bus 230. Additionally, low voltage circuit 270 may be configured to trigger a drive imbalance fault signal 275 to controller 215. In response to receiving the drive imbalance fault signal 275, controller 215 may disable the inverter 228, also limiting current in and/or stopping drive 110. The limited current due to the precharge mode and/or disabling the inverter 228, lowers the current in capacitor 244 as well as the other capacitors 238, 240, 242, 246, 248 such that none exceed thermal limits sufficient to cause them to explode or ignite. As such, the drive 110 fails, but not catastrophically and the failure of drive 110 is such that danger of excess current, voltage, fire, or explosion are mitigated.

Figure 3:
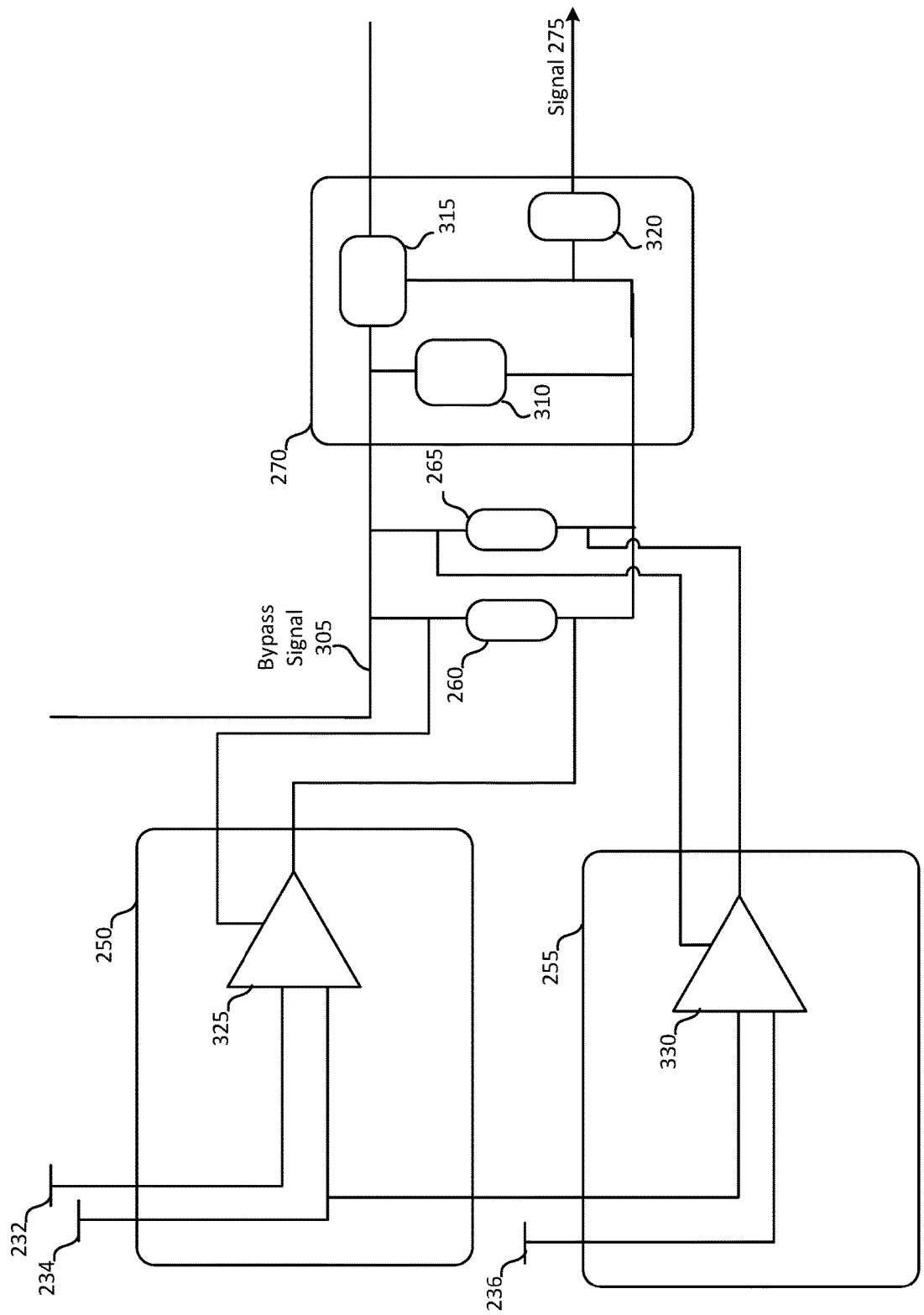
FIG. 3 illustrates protection circuitry, according to some embodiments.

FIG. 3 illustrates further details of protection circuits 250 and 255, isolation circuits 260 and 265, and low voltage circuit 270. The protection circuit 250 compares the voltage across capacitors coupling positive bus rail 232 and midbus rail 234 (i.e., upper bus capacitors) with a threshold voltage using comparator 325. Comparator 325 may be, for example, an operational amplifier configured to perform the comparison. When it is determined that the voltage across the upper bus capacitors exceeds the threshold, the isolation circuit 260 is activated. Isolation circuit 260 may be a circuit that, when not active, does not conduct and accordingly does not activate low voltage circuit 270. When activated, isolation circuit 260 conducts and activates low voltage circuit 270. Isolation circuit 260 may be, for example, an optocoupler.

Similarly, protection circuit 255 compares the voltage across capacitors coupling midbus rail 234 and negative bus rail 236 (i.e., lower bus capacitors) with a threshold voltage using comparator 330. Protection circuits 250 and 255 may be substantially similar in that the comparators 325 and 330 perform substantially similarly. When the comparison of the voltage across the lower bus capacitors exceeds the threshold voltage as determined by comparator 330, isolation circuit 265 is activated. Isolation circuits 260 and 265 may be substantially similar. When protection circuit 255 is activated, isolation circuit 265 conducts and activates low voltage circuit 270.

Low voltage circuit 270 includes latch circuit 310, bypass signal interrupt circuit 315, and fault trigger circuit 320. Low voltage circuit 270 may be coupled to the bypass signal 305 that is used to engage the controlled rectifier 226 and bypass precharge circuit 220 so that drive 110 is not in precharge mode. The bypass signal 305 may have a small voltage associated with it sufficient to power the low voltage circuit 270. During normal operation, the latch circuit 310 and fault trigger circuit 320 are not engaged, and the bypass signal interrupt circuit 315 is conducting to ensure the bypass signal 305 is not interrupted.

When one or the other of isolation circuits 260 or 265 are activated, the latch circuit 310 is engaged, and the bypass signal interrupt circuit 315 is disengaged, interrupting the bypass signal 305. When the bypass signal 305 is interrupted, the controlled rectifier 226 deactivates or switches off, causing input 205 to flow through precharge circuit 220 and returning the drive 110 to precharge mode. As described above, precharge circuit 220 limits current to DC bus 230. The latch circuit 310 ensures that even if the comparators 325 and 330 determines the voltage across the DC bus capacitors falls below the threshold, once the low voltage circuit 270 interrupts the bypass signal 305 by deactivating the bypass signal interrupt circuit 315, it remains deactivated (i.e., disengaged, not conducting) so that the bypass signal 305 remains interrupted, keeping the drive 110 in precharge mode.

The fault trigger circuit 320 is also activated when one or the other of isolation circuits 260 or 265 are activated. The fault trigger circuit 320 transmits a drive imbalance fault signal 275 to controller 215. As described above, the controller 215 can then disable the inverter 228, limiting current in and/or stopping drive 110.

Figure 4:
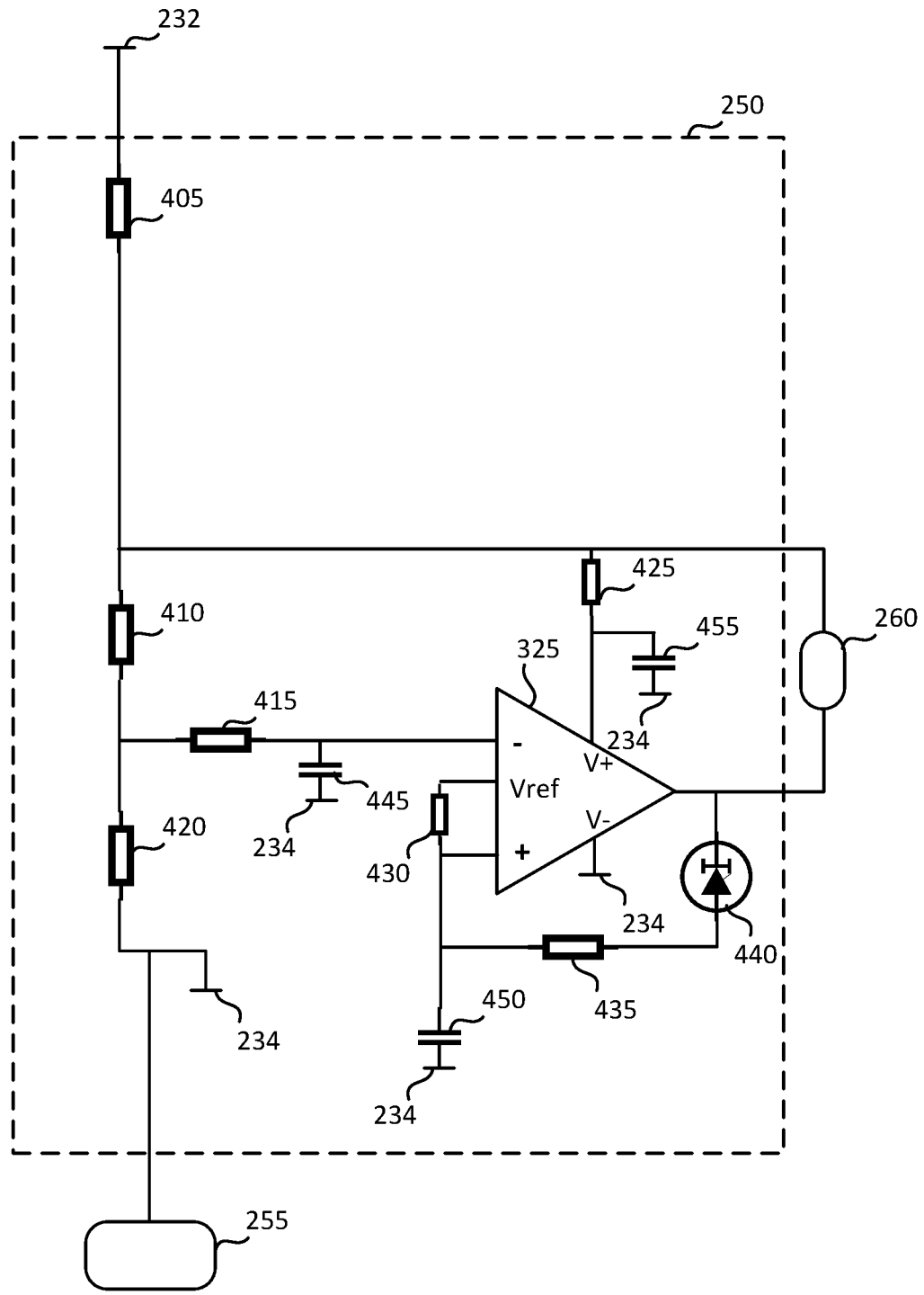
FIG. 4 illustrates a protection circuit, according to some embodiments.

FIG. 4 illustrates additional detail of protection circuit 250. Protection circuit 250 may be coupled to the positive bus rail 232 via resistors 405. Resistors 405 may be a resistor string sized and configured to limit the current and voltage provided to protection circuit 250. Protection circuit may also be coupled to midbus rail 234. The protection circuit 250, accordingly measures the voltage across the upper bus capacitors between the positive bus rail 232 and the midbus rail 234. The resistors 405 may be configured such that the current through the resistor string is sufficiently low (e.g., 1 milliamp). The resistor string 405 may also be configured so that a known voltage is provided to resistor 425 when the surge voltage or threshold voltage is reached. For example, the voltage provided to resistor 425 from resistor string 405 may be 5.5 volts when the surge voltage limit is reached. The comparator 325 may be configured to compare the voltage measured across the upper bus capacitors with a threshold voltage set to or around the voltage provided to resistor 425 that corresponds to the surge voltage rating of the capacitors in the upper bus. The comparator 325 may be selected and the resistors 410, 420, 415, 425, 430, 435, diode 440, and capacitors 445, 450, and 455 may be sized and configured to measure the voltage across the upper bus capacitors and allow comparator 325 to compare the voltage with the threshold voltage and, when the voltage exceeds the threshold voltage, activate isolation circuit 260. Resistors 410, 420, 415, 425, 430, 435 may be configured in any suitable way including multiple resistors in series or parallel and sized to configure protection circuit 250 to operate as intended based on the operating voltage of DC bus 230. Similarly, capacitors 445, 450, 455 may be configured individually to include multiple capacitors coupled in series or in parallel or any other suitable configuration to configure protection circuit 250 to operate as intended based on the operating voltage of DC bus 230. For example, the operating power supply range for the comparator 325 may be 1.8 to 5.5 volts so that when 5.5 volts is exceeded, which in this example is the voltage at resistor 425 based on the resistor string 405 when the surge voltage of the upper bus capacitors is reached (e.g., 450 volts), the drain output of comparator 325 is open and the isolation circuit 260 is activated. Isolation circuit 260 may be, for example, an optocoupler that conducts when the voltage across the upper bus capacitors exceeds the threshold voltage. The diode 440 may prevent the isolation circuit 260 from pulling up the non-inverting input of the comparator 325 when isolation circuit 260 is not conducting. The non-inverting input of the comparator 325 is pulled down through a feedback resistor 435 when the comparator 325 is triggered to provide hysteresis. The configuration of protection circuit 250 as depicted is exemplary. Protection circuit 250 may include more or fewer components that are configured such that protection circuit 250 measures the voltage across the upper bus and compares it with the threshold voltage to activate the isolation circuit. Protection circuit 255 is substantially similar and is coupled to the midbus rail 234 and negative bus rail 236 to measure the voltage across the lower bus capacitors. Another consideration is that during a valid precharge mode, the comparator 325 may activate the isolation circuit 260. In such a situation, the latch circuit 310 will not latch the bypass interrupt circuit 315 because the bypass signal 305 is already pulled low.

One technical advantage of the protection circuit 250 as configured is that it is self-powered. No additional or external power source is required to power protection circuit 250 because the measured voltage across the upper bus powers the protection circuit 250. Similarly, the protection circuit 255 is powered by the voltage measured across the lower bus capacitors.

Figure 5:
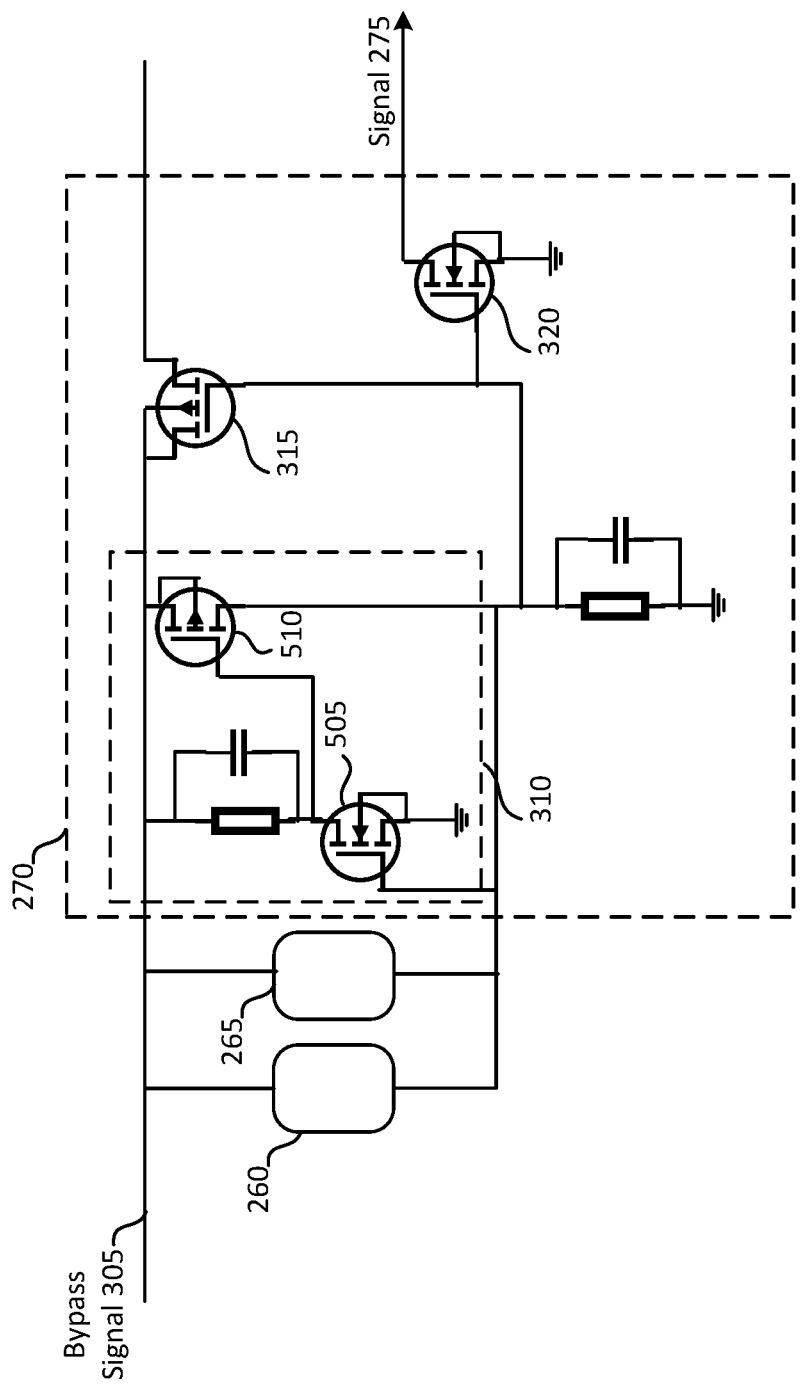
FIG. 5 illustrates a low voltage circuit, according to some embodiments.

FIG. 5 illustrates additional detail of low voltage circuit 270. Low voltage circuit 270 may include latch circuit 310, bypass interrupt circuit 315, and fault trigger circuit 320. Bypass interrupt circuit 315 may include a p-channel transistor in some embodiments. The bypass interrupt circuit 315 is conducting during normal operation of the drive 110, so that the bypass signal 305 is not interrupted. Also, during normal operation, the isolation circuits 260 and 265 are not conducting. The fault trigger circuit 320 may include an n-channel transistor that is not conducting during normal operation of drive 110 and therefore signal 275 is not being transmitted. Latch circuit 310 may include an n-channel transistor 505 and a p-channel transistor 510, neither of which are conducting during normal operation of drive 110.

When a drive imbalance causes an overload condition of a DC bus capacitor 238, 240, 242, 244, 246, and/or 248, at least one of the isolation circuits 260 and 265 will conduct based on their associated protection circuits 250 and 255 respectively as described with respect to FIG. 4. When either of isolation circuits 260 or 265 conducts, the bypass interrupt circuit 315 stops conducting, causing an interrupt to the bypass signal 305. As previously described, the bypass signal 305 being interrupted deactivates the controlled rectifier 226 and puts the drive 110 in precharge mode, causing the input 205 to go through precharge circuit 220 and fusible resistor 222 before reaching DC bus 230. The precharge circuit 220 limits current to the DC bus 230, and if the current exceeds the threshold of the fusible resistor 222, the fusible resistor 222 will fail, opening the circuit to limit leakage current from input 205 into DC bus 230. Limiting the current in DC bus 230 will prevent the DC bus capacitors 238, 240, 242, 244, 246, 248 from igniting or exploding.

When the low voltage circuit 270 is activated by the activation of at least one of the isolation circuits 260, 265, the latch circuit 310 is also activated such that both transistors 505 and 510 begin conducting. The configuration of the latch circuit 310 is such that even if the protection circuits 250, 255 determine the overcharge condition of the capacitors has ended, causing the isolation circuits 260, 265 to stop conducting (i.e., deactivating the isolation circuits 260, 265), the latch circuit 310 will continue conducting, keeping the bypass interrupt circuit 315 deactivated (i.e., non-conducting) so that the bypass signal 305 remains interrupted and the drive 110 remains in precharge mode.

When the low voltage circuit 270 is activated by the activation of at least one of the isolation circuits 260, 265, the fault trigger circuit 320 is also activated and begins conducting, causing the drive imbalance fault signal 275 to transmit to the controller 215. The controller 215 may, for example, in response, disable the inverter 228 to stop the drive 110, further limiting current in DC bus 230 so the DC bus capacitors 238, 240, 242, 244, 246, 248 do not ignite or explode.

A technical benefit of the low voltage circuit 270 is that it is self-powered. During normal operation, the bypass signal 305 powers the bypass interrupt circuit 315 such that it conducts and needs no external or other power source. Upon fault, the isolation circuits 260, 265 conduct, providing further power to the low voltage circuit 270 to activate the latch circuit 310 and the fault trigger circuit 320, and the bypass signal 305 continues to provide sufficient power to the low voltage circuit 270 even if the isolation circuits 260, 265 stop conducting after a fault occurs.

Figure 6:
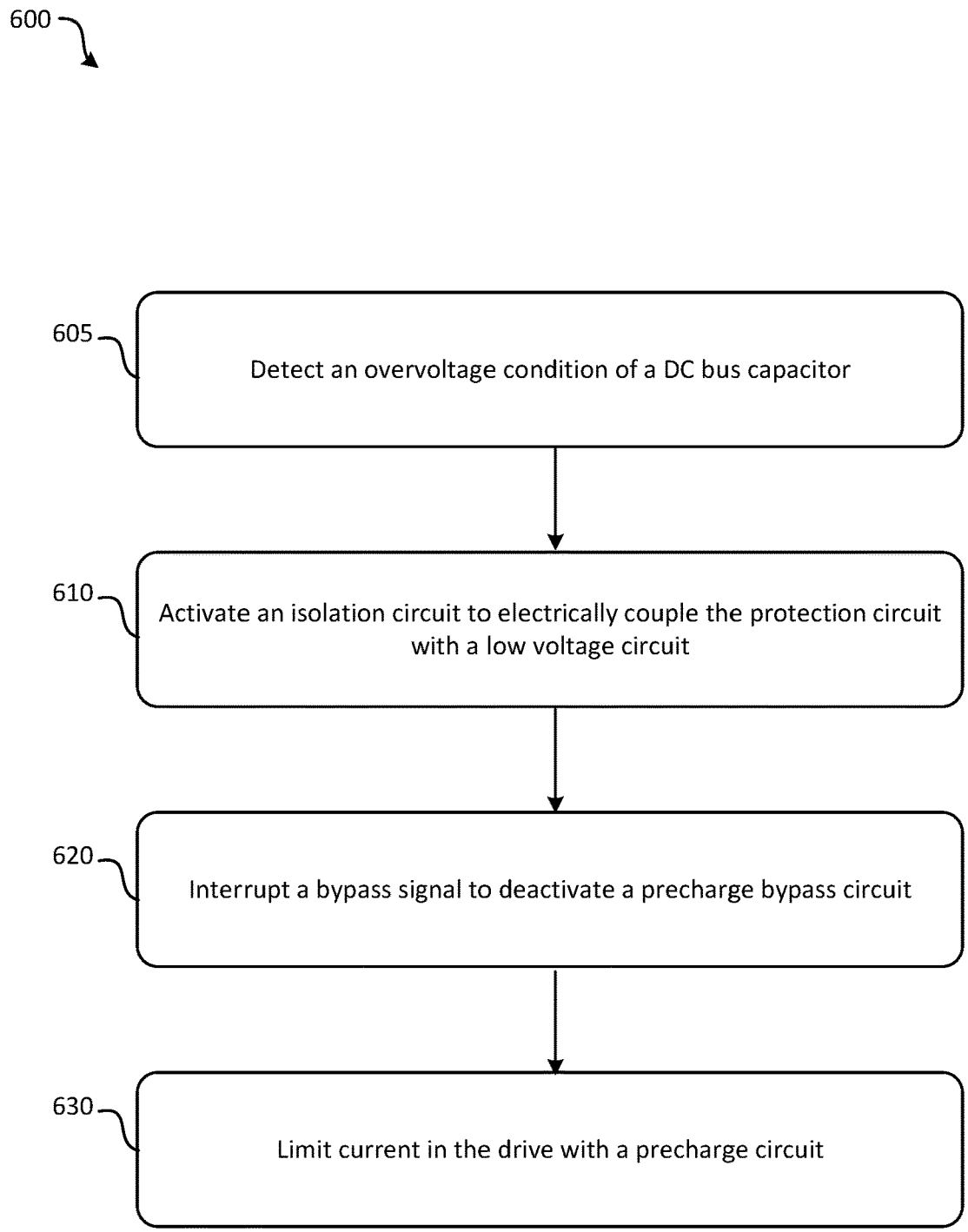
FIG. 6 illustrates a process for configuring a drive to avoid catastrophic failure, according to some embodiments.

FIG. 6 illustrates a method of protecting a drive, such as drive 110, from catastrophic failure. The method 600 includes steps a drive is configured to perform to avoid catastrophic failure. At step 605, the drive may use a protection circuit, such as protection circuit 250, 255, to detect an overvoltage condition of a DC bus capacitor. The DC bus capacitor may be, for example one of DC bus capacitors 238, 240, 242, 244, 246, 248. The protection circuit may measure the voltage across the DC bus capacitor and compare the voltage with a threshold voltage. The threshold voltage may be based on the surge voltage of the DC bus capacitor such that when the voltage across the DC bus capacitor exceeds its threshold voltage, the comparator (e.g., comparator 325, 330) activates an isolation circuit (e.g., isolation circuit 260, 265) at step 610. The isolation circuit, upon activation, electrically couples the protection circuit with a low voltage circuit (e.g., low voltage circuit 270). When the low voltage circuit is activated by the activation of the isolation circuit, the low voltage circuit may interrupt a bypass signal (e.g., bypass signal 305) to deactivate a precharge bypass circuit (e.g., controlled rectifier 226). When the precharge bypass circuit is deactivated, at step 630, a precharge circuit (e.g., precharge circuit 220) may limit current in the drive, putting the drive in precharge mode.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. For example, while this technology is described in a drive, any component having a DC bus may implement the solution described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for" but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A drive apparatus comprising:
   a precharge circuit configured to:
      limit current in the drive apparatus;
   a bypass circuit coupled to the precharge circuit, the bypass circuit configured to:
      bypass the precharge circuit in response to a bypass signal;
   a direct current (DC) bus comprising a capacitor;

an isolation circuit;
a protection circuit comprising a comparator, the protection circuit coupled to the isolation circuit and the capacitor of the DC bus, and the protection circuit configured to:
compare a first voltage measured across the capacitor with a threshold voltage; and
in response to the first voltage exceeding the threshold voltage, activate the isolation circuit; and
a low voltage circuit coupled to the isolation circuit, the low voltage circuit configured to:
in response to the protection circuit activating the isolation circuit:
interrupt the bypass signal to disengage the bypass circuit and activate the precharge circuit.

2. The drive apparatus of claim 1, wherein the precharge circuit is coupled in series with one or more fusible resistors coupled to the DC bus.

3. The drive apparatus of claim 2, wherein the precharge circuit comprises at least one resistor, and wherein the fusible resistors are configured to fail before the at least one resistor in the precharge circuit ignites.

4. The drive apparatus of claim 1, wherein the protection circuit is powered with the first voltage.

5. The drive apparatus of claim 1, wherein the low voltage circuit is powered with the bypass signal.

6. The drive apparatus of claim 1, wherein the low voltage circuit is further configured to:
in response to the protection circuit activating the isolation circuit:
trigger a drive imbalance fault.

7. The drive apparatus of claim 6, wherein the drive apparatus further comprises:
an inverter; and
a controller configured to:
in response to the low voltage circuit triggering the drive imbalance fault, disable the inverter to limit current in the drive apparatus.

8. The drive apparatus of claim 1, wherein the low voltage circuit comprises a latch circuit, the latch circuit configured to:
activate in response to the protection circuit activating the isolation circuit; and
continue to interrupt the bypass signal when the isolation circuit deactivates.

9. The drive apparatus of claim 1, wherein:
the capacitor is a first capacitor of a plurality of capacitors coupled in series;
the protection circuit is a first protection circuit of a plurality of protection circuits;
each capacitor of the plurality of capacitors is coupled to a respective protection circuit of the plurality of protection circuits;
the isolation circuit is a first isolation circuit of a plurality of isolation circuits; and
each protection circuit is coupled to the low voltage circuit through a respective isolation circuit of the plurality of isolation circuits.

10. The drive apparatus of claim 1, wherein the isolation circuit comprises an optocoupler that, when activated, electrically conducts to electrically couple the protection circuit to the low voltage circuit.

11. A method comprising configuring a drive to:
detect, with a protection circuit, an overvoltage condition of a direct current (DC) bus capacitor;
in response to detecting the overvoltage condition, activate an isolation circuit to electrically couple the protection circuit with a low voltage circuit;
in response to activating the isolation circuit, interrupt a bypass signal with the low voltage circuit to deactivate a precharge bypass circuit; and
in response to deactivating the precharge bypass circuit, limit current in the drive with a precharge circuit.

12. The method of claim 11, further comprising configuring the drive to:
in response to activating the isolation circuit, transmit, with the low voltage circuit, a drive imbalance fault signal to a controller of the drive.

13. The method of claim 12, further comprising configuring the drive to:
in response to receiving the drive imbalance fault signal, disable, with the controller, an inverter of the drive.

14. The method of claim 11, wherein detecting the overvoltage condition comprises configuring the drive to:
measure a voltage across the DC bus capacitor;
compare the voltage with a threshold voltage; and
detect the overvoltage condition in response to the voltage exceeding the threshold voltage.

15. The method of claim 11, further comprising configuring the drive to:
open the precharge circuit using fusible resistors coupled in series between the precharge circuit and the DC bus capacitor, wherein the fusible resistors are configured to fail before a precharge resistor of the precharge circuit ignites.

16. The method of claim 11, further comprising configuring the drive to:
charge the protection circuit with a voltage measured across the DC bus capacitor.

17. The method of claim 11, further comprising configuring the drive to:
charge the low voltage circuit with the bypass signal.

18. The method of claim 11, wherein the DC bus capacitor is a first DC bus capacitor of a plurality of DC bus capacitors, the method further comprising configuring the drive to:
detect the overvoltage condition of any one of the plurality of DC bus capacitors.

19. The method of claim 11, further comprising configuring the drive to:
latch the low voltage circuit to continue to interrupt the bypass signal upon deactivation of the isolation circuit.

20. The method of claim 11, further comprising:
testing the drive configuration by causing the overvoltage condition of the DC bus capacitor.

* * * * *